Patented May 28, 1940

2,202,283

UNITED STATES PATENT OFFICE 2,202,283

METHOD OF DECORATING TEXTILES AND COMPOSITION FOR USE THEREIN

Norman S. Cassel, Ridgewood, N. J., assignor to Interchemical Corporation, New York, N. Y., a corporation of Ohio No Drawing. Application June 24, 1938,
Serial No. 215,585

10 Claims. (Cl. 8—70)

This invention relates to the art of textile printing, and is directed particularly to new textile printing pastes, and to new methods of applying dyestuffs to fabrics. Specifically, this invention is directed to dyestuff printing pastes and dyestuff printing methods in which a water solution of a dyestuff is emulsified in the interior phase of a water immiscible bodying composition, and fabrics are printed with such emulsions to produce prints of unusual beauty at reduced cost.

The conventional method of textile printing involves the application to a textile fabric of a dye, or a component of a dye, in water solution, by means of an intaglio cylinder. In order to get the dyestuff solution thick enough to remain in the cells of the printing cylinders, and to remain in place when applied to the fabric, water-soluble thickening agents such as British gum, starch and the like are used. More recently, wetting agents have been added to the pastes to improve their printing properties. After printing, the dyestuffs are set by various means so that they become water-insoluble, and the fabric is washed to remove the water-soluble thickeners.

Certain difficulties are encountered with these conventional dyestuff pastes. Since the fabrics printed are rather water-absorbent, prints made with water solutions, even when made viscous with the water soluble thickeners, tend to spread out slightly from the point of application, a phenomenon known as flushing. As a result, the lines in the engraving may become somewhat blurred, and very fine lines close together may be entirely lost. When the viscosity of the pastes are adjusted so that no flushing occurs, the pastes become too thick to separate cleanly from the engravings. A compromise must always be made, so that effective separation occurs without substantial flushing; and the cylinders must be so prepared as to print most easily. Fine photogravure engravings have, as a consequence, never been used with conventional textile printing pastes, because their faithful reproduction of detail would not register on the fabric. Furthermore, the engravings used must be rather deep in order to get effective printing, and considerably more paste is used than is really necessary to produce most designs.

Another disadvantage of conventional dyestuff pastes is that a substantial quantity of dyestuff may be washed out with the thickeners. This is due partially to mechanical suspension of converted dyestuff in the film of thickener, and partially to incomplete conversion of the dyestuff to the insoluble form, due to the trapping of the soluble dyestuff inside of the thickener film. This may represent a serious loss of dyestuff.

I have discovered a means whereby these disadvantages may be overcome, and successful dyestuff printing can be done with photogravure and other relatively shallow engravings, with the retention of the complete detail of the photogravure cylinders, and the use of a minimum of dyestuff. My invention comprises the preparation of dyestuff printing pastes by the emulsification of an aqueous solution of a dye or a dye component with a water immiscible bodying composition (preferably a solution of a film-forming substance in a solvent), the dyestuff solution being in the discontinuous phase. The resultant emulsion, of optimum consistency for printing, is applied to a fabric, as with a conventional intaglio cylinder; the dyestuff is fixed on the fabric, and the fabric is then dried, with or without washing, depending on the dyestuff employed.

As the emulsion is applied to the cloth and the emulsion breaks, the dyestuff solution penetrates into the yarns of the fabric. Since the water phase and the bodying agent are mutually repellent, the non-aqueous phase prevents undue spreading of the aqueous phase. As a result, substantially no flushing occurs, and fine printing is obtained, which preserves the fine lines of a photogravure engraving even on materials which are as difficult to print as cotton flannels.

Since the fabric is water absorbent, the non-aqueous phase is kept on the surface, and retains but a negligible amount of dyestuff. As a result of the separation of the thickener from the dyestuff solution, the conversion of the dyestuff to the insoluble form is hastened, and is more complete. Consequently, when the fabric is washed, little soluble dyestuff remains to be washed out, with the result that the amount used can be reduced considerably as compared to ordinary dyestuff printing.

Still another advantage of the absence of binder in the water phase lies in the ability of the thin water solution to penetrate through the fabric, and give a print which is uniform on both sides of the fabric, to simulate woven goods. To obtain such printing, it is necessary to use engravings which are sufficiently deep so that enough color solution is deposited to force its way to the back of the fabric.

If, on the contrary, use is made of shallow engravings which will not print well when conventional dyestuff pastes are used, the amount of dyestuff can be reduced in some instances to as much as one-half of that necessary with conventional pastes and engravings, due to the fact that less dyestuff is deposited. In such case, the color is confined to the surface to a considerable degree. The saving is not as pronounced with solid blotches of color as with fine designs, since the large masses of color tend to force the water further into the fabric than fine lines do.

Still another advantage of my process is the stabilizing influence it has on dyestuffs. Many dyestuffs, particularly the naphthols, when made into printing pastes, will lose color completely within less than 24 hours, apparently due to reaction in the paste. When using the same dyestuffs in pastes made according to my invention, I have noticed that the loss of color is retarded, and that the dyestuffs remain usable as much as ten times as long in many instances.

Another advantage is that in printing sheer fabrics, my pastes do not embrittle the fabrics as do the conventional printing pastes; and the danger of cracking such fabric during the printing and finishing operations is minimized.

Some of the advantages referred to above arise from the use of very small quantities of substance in the non-aqueous outer phase of the emulsion. As can be observed from the examples, the amount of substance used does not exceed 5% in any instance, and is generally well below this figure, being kept by preference at a minimum consistent with sufficient stability to permit printing of the emulsion.

Practically all types of dyestuffs can be printed in this fashion, in all sorts of water-immiscible binders. The agent which converts the soluble dyestuff to the insoluble form can be incorporated in the fabric before printing, or added afterward.

Typical examples of my invention are as follows:

EXAMPLE I.—*Naphthol printing paste*

A dyestuff paste was made up by dissolving 4 parts by weight of Variamine blue R T (General Dyestuffs Corp. Schultz Color Index, Supplementary #1, #114A) in 82.4 parts by weight of water. This was mixed with a solution made by dissolving 1.75 parts by weight alkyd resin (made by reacting 420 parts by weight of glycerol, 600 parts phthalic anhydride, and 688 parts fatty acids of linseed oil at about 230° C. to an acid number of less than 9.0)

in .95 part by weight xylol 2.90 parts by weight "solvesso #3" (Standard Oil Co. of New Jersey) (hydrogenated petroleum naphtha, boiling range 190° C. to 215° C.)

8.00 parts by weight octyl acetate and the mixture was passed through a colloid mill, yielding an emulsion with the dyestuff solution as the inside phase.

For the sake of comparison, two conventional dyestuff pastes were made up, as follows:

Thin dyestuff paste

| | Parts by weight |
|---|---|
| Variamine blue RT | 4.0 |
| Gum tragacanth solution (60 gum, 1000 water) | 45.0 |
| Water | 51.0 |

Thick dyestuff paste

| | |
|---|---|
| Variamine blue | 4.0 |
| Gum tragacanth solution (60 gum, 1000 water) | 80.0 |
| Water | 16.0 |

Cotton fabric was prepared for printing by impregnating it with a 1% aqueous solution of naphthol A. S. (beta-hydroxynaphthoic acid anilide) and the cloth was printed with all three pastes, using various engravings. All prints were finished in conventional fashion, by drying, soaping at the boil, rinsing and drying.

With a fine photogravure engraving, neither conventional paste yielded satisfactory results, as the thin paste flushed, while the thick paste would not print well. My paste yielded a faithful reproduction of the design.

With several deep typical pantograph and mill and die engravings in conventional use in the textile printing field, the thin conventional gum paste flushed, while the heavier paste gave good results except where very fine lines were present, close together, while good printing was obtained with my paste throughout. However, the prints obtained with my paste were not quite as satisfactory where heavy blotches of material were laid down, because the color was less intense. When the amount of dyestuff was increased in my paste so that equal volumes of paste contained the same quantity of dyestuff, the difference in color became negligible.

By changing the engravings to a shallow type, I was able to duplicate the designs obtained with the conventional engravings, with a substantial reduction in the amount of dye paste used. These shallow engravings could not be used with the conventional pastes.

The color developed slightly faster with my paste than with the conventional paste, and the wash water was less strongly colored.

EXAMPLE II.—*Direct dye*

A printing paste was prepared by emulsifying a solution of 4 parts by weight of Trisulfon Brown M B (Sandoz) (Schultz Index #678) in 70 parts by weight of water in a water immiscible continuous phase consisting of

| | Parts |
|---|---|
| Alkyd resin of Example I | 3 |
| "Solvesso #3" | 23 |

This was printed in comparison with a conventional paste of the same strength, of optimum consistency for printing, made by taking 4 parts of dye, 41 parts of water, and 55 parts of gum tragacanth solution (60 gum, 1,000 water). The conventional prints were finished by setting with steam, followed by washing to remove the gum, while my prints required no washing, yielding satisfactory results merely by steam setting. In this case, far better results were obtained throughout with my new paste, both as to fineness of detail and as to depth of blotch colors, indicating a considerable saving of dyestuff even with conventional deep engravings. The advantage of my process was most striking with a photogravure plate.

EXAMPLE III.—*Vat dyestuff*

A paste was made up as follows:
A solution of
5 parts by weight Algosol Blue AZG (General Dyestuff Corp. Pat. #1,448,251) (Schultz Index #1332)

in 73 parts by weight water was emulsified in a water-immiscible phase, consisting of—
3.0 parts by weight Bold Batu East India Gum
19.0 parts by weight "Solvesso #3"

Thin and thick conventional dyestuff pastes were likewise prepared, with the same percentage by weight of dyestuff; and prints were made therefrom, which were finished by the nitrile process in conventional fashion. The comparative results obtained were very similar to those obtained in Example I, except that the difference in results obtained with fine lines was far more marked than in Example I.

EXAMPLE IV.—*Naphthol with cellulose ester*

An emulsion was prepared by dispersing a solution of 4 parts by weight of Variamine Blue RT in 51.5 parts by weight of water, in a lacquer consisting of—

| | Parts by weight |
|---|---|
| ½" R. S. Nitrocellulose | 1.1 |
| Toluol | 9.0 |
| Butanol | 4.0 |
| Octyl acetate | 16.4 |
| Dibutyl phthalate | 4.0 |
| Butyl acetate | 9.0 |

The resultant emulsion was printed as in Example I, and gave results substantially identical with the alkyd resin emulsion of the same color.

Other dyestuffs of the types indicated, and of other water-soluble types now used for conventional printing, may be substituted for the dyestuffs indicated in the examples. Where acid or alkali is necessary to put the dyestuff into solution, care should be taken with the vehicle that it be resistant to the action of the chemicals.

The water-immiscible bodying agent chosen should be sufficiently film-forming to be capable of forming a continuous phase about the dyestuff solution. I have found that water-immiscible solutions in organic solvents of most film-forming organic compounds may be used successfully, and have successfully used bodied oils, alkyd resins, hydrophobe urea-formaldehyde resins, cumarone-indene resins, natural resins such as damar and batu, rosin glycerol ester gums, cellulose esters such as nitrocellulose and cellulose acetate, cellulose ethers such as benzyl and ethyl cellulose, and rubber and rubber derivatives.

It is desirable that the water-immiscible phase be kept at a minimum, and the water at a maximum, to permit the introduction of maximum dyestuff into the composition. I have obtained stable emulsions with as slow as ¾% of film-forming substance in a total water-immiscible phase of 15%, and it may be possible to go even lower. I prefer, however, to operate with a factor of safety, and ordinarily use from 65% to 80% of water. The water content may, if desired, be reduced much below these figures, so long as there is sufficient water to hold the dyestuff in solution; I have obtained satisfactory prints with pastes containing only 40% of water. However, ths is uneconomical, since it increases the cost of the paste unnecessarily.

By using a permanent water-immiscible substance such as a plasticized hydrophobe urea formaldehyde resin, it is possible to obtain both a printed design and a permanent sizing in one operation.

In the specification and claims, the term "dyestuff" means a complete dye, or a component of a dye, and the term "undeveloped dyestuff" means that the dye or dye component is in such form that it lacks the color of the finished dye on the fabric.

I claim:

1. The method of decorating a textile fabric which comprises printing a textile fabric with an emulsion the inner phase of which is a water solution of a textile dyestuff and the outer phase of which comprises a water-immiscible film forming liquid.

2. The method of decorating a textile fabric which comprises printing a textile fabric with an emulsion the inner phase of which is a water solution of a textile dyestuff and the outer phase of which comprises a water-immiscible solution of a film forming substance in a volatile organic solvent.

3. The method of decorating a textile fabric which comprises impregnating a textile fabric with a dye component, imprinting the fabric with an emulsion the inner phase of which is a water solution of a dye component capable of reacting with the first dye component, and the outer phase of which comprises a water-immiscible film forming liquid, and thereafter causing the dye components to react in the fabric.

4. The method of decorating a textile fabric which comprises printing a textile fabric with an emulsion the inner phase of which is a water solution of a leuco form of a vat dyestuff, and the outer phase of which comprises a water immiscible film forming liquid, and thereafter converting the soluble leuco compound to the insoluble form.

5. A textile printing composition comprising an emulsion, the outer phase of which comprises a water-immiscible solution of a film forming substance in a volatile organic solvent, and the inner phase of which comprises a solution of a dyestuff in water, the film-forming substance comprising 5% or less of the total composition.

6. A textile printing composition comprising an emulsion, the outer phase of which comprises a water-immiscible solution of a film forming substance substantially free of pigment in a volatile organic solvent, and the inner phase of which comprises a solution of an undeveloped dyestuff in water.

7. A textile printing composition comprising an emulsion, the outer phase of which comprises a water-immiscible solution of a film forming substance in a volatile organic solvent, and the inner phase of which comprises a solution of an undeveloped dyestuff in water, the film-forming substance comprising 5% or less of the total composition.

8. The method of decorating a fabric which comprises applying to the fabric an emulsion of a water solution of a dyestuff dispersed in a water-immiscible solution of a film forming substance dissolved in a volatile organic solvent, the film-forming substance comprising 5% or less of the total composition.

9. The method of decorating a fabric which comprises applying thereto an emulsion of a water solution of an undeveloped dyestuff dispersed in a water-immiscible solution of a film forming substance dissolved in a volatile organic solvent, allowing the undeveloped dyestuff to penetrate into the fabric, and developing the dyestuff in the fabric.

10. A textile dyestuff printing paste comprising an aqueous dyestuff solution emulsified within an amount of thin, colorless, water-immiscible, film-forming lacquer sufficient to give the composition printable consistency.

NORMAN S. CASSEL.